United States Patent [19]

Moskowitz et al.

[11] 3,899,395

[45] Aug. 12, 1975

[54] LIPOLYTIC ENZYME RECOVERY METHOD

[75] Inventors: Gerard J. Moskowitz, Buffalo Grove; John J. Como, Glenview; Louis I. Feldman, Morton Grove, all of Ill.

[73] Assignee: Baxter Laboratories, Inc., Morton Grove, Ill.

[22] Filed: June 10, 1974

[21] Appl. No.: 477,889

[52] U.S. Cl................................................ 195/66 R
[51] Int. Cl............................................... C07g 7/02
[58] Field of Search............................ 195/66 R, 65

[56] References Cited

UNITED STATES PATENTS 3,591,388  7/1971  Moelker et al. .................. 195/66 X Primary Examiner—Lionel M. Shapiro
Attorney, Agent, or Firm—Scott J. Meyer; Louis Altman

[57] ABSTRACT

Lipolytic enzyme is selectively and quantitatively recovered from the fermentation growth product of Mucor species by adsorption with diatomaceous earth or clays at relatively low pH followed by elution of the lipolytic enzyme from the adsorbent by adjustment to relatively high pH.

10 Claims, No Drawings

LIPOLYTIC ENZYME RECOVERY METHOD

This invention relates to an enzyme recovery method. More particularly, this invention pertains to a method for the recovery of a lipolytic enzyme from the fermented growth product of Mucor microorganisms.

It is known that the fermented growth products of Mucor microorganisms contain lipolytic enzymes in admixture with other enzymes such as carbohydrases, proteases and the like as disclosed in U.S. Pat. No. 1,391,219.

Recently, the recovery of valuable and commercially important milk coagulating enzymes from Mucor species has been disclosed. Typical species from which such enzymes, commonly referred to as microbial rennet, have been obtained are *Mucor pusillus* as described in U.S. Pat. Nos. 3,151,039 and 3,212,905, and *Mucor miehei* as disclosed in U.S. Pat. Nos. 3,549,390 and 3,763,011. In U.S. Pat. pH 2.0–3.5 at 20°–55° C. According to German Offenlegungsschrift No. 2,323,996, lipase impurities are removed from the desired rennet by adjustment to pH 4–6 followed by filtration. in U.S. Pat. Nos. 3,549,390 and 3,763,011. In U.S. Pat. No. 3,616,233, undesired lipolytic enzymes which are produced together with the rennet enzyme in Mucor species are removed from the desired rennet by inactivation or destruction by adjustment to pH 2.0–3.5 at 20°–55° C. According to German Offenlegungsschrift No. 2,232,996, lipase impurities are removed from the desired rennet by adjustment to pH 4–6 followed by filtration.

In copending application Ser. No. 458,737, filed May 2, 1974, owned by a common assignee (and herewith incorporated by reference), there is disclosed the production of a lipolytic enzyme flavoring system from *Mucor miehei* which has the desirable property of expressing greater esterase than lipase lipolytic enzyme activity. That is, it shows an EA/LA ratio greater than one. Thus, a practical method for the recovery of lipolytic enzyme having the foregoing flavoring system properties would be of significant value to the food industry. Accordingly, it is an object of the present invention to provide such a recovery method.

Briefly stated, the present invention comprises the recovery of a useful lipolytic enzyme from the fermented growth product of Mucor species by treatment of said growth product with diatomaceous earth and clay adsorbents at relatively low pH followed by elution of the adsorbed material at relatively high pH.

It has been surprisingly and unexpectedly found that selective recovery of the desired lipolytic enzyme from the rennet enzyme is achieved according to the method of the present invention in nearly quantitative yields. The yield of rennet also is excellent, thereby permitting its retention for use as a milk coagulating enzyme as desired according to prior practice.

The preferred pH range for adsorption of the lipolytic enzyme is about 4 to 6 whereas the preferred pH range for elution of the lipolytic enzyme is about 9 to 11.

The preferred diatomaceous earths are "Celite" filter aids which are commercially available from Johns-Manville and most preferably "Filter-Cel". The latter material is the finest Celite grade diatomite with a screen analysis of 1% retained on 150 Mesh. It is a natural diatomite which has been selectively quarried, dried, milled and air-classified. Its chemical analysis is reported as follows:

| Component | % |
|---|---|
| $SiO_2$ | 85.8 |
| $Al_2O_3$ | 3.8 |
| $Fe_2O_3$ | 1.2 |
| $P_2O_5$ | 0.2 |
| $TiO_2$ | 0.2 |
| CaO | 0.5 |
| MgO | 0.6 |
| $Na_2O$ | 1.1 |
| $K_2O$ | 1.1 |

Clay materials which can be used in accordance with the invention are montmorillonites and hydrated aluminum silicates such as bentonite and kaolin. The preferred clay as "Volclay" which is a western bentonite commercially available from Whittaker, Clark & Daniels, Inc.

The foregoing adsorbent materials are used at concentrations ranging from about 0.5 to about 15% and preferably from about 1.0 to about 5% by weight. Concentrations greater than 15% are unnecessary.

The adsorption step can be carried out by adjusting the growth product from the fermentation of Mucor species to relatively low pH and thoroughly admixing with the diatomaceous earth or clay material at ambient temperatures. The adsorbed material is then separated from the non-adsorbed rennet enzyme material such as by filtration or centrifugation. The desired lipolytic enzyme can then be eluted from the separated adsorbent material by adjustment to relatively high pH and thoroughly mixing at ambient room temperature.

In most cases, mixing such as by stirring for about 15 minutes to about 2 hours is adequate to achieve the desired adsorption and elution. Mixing at normal room temperatures such as about 20° to 25° C is suitable and there is no need to reduce or increase the ambient temperature during the mixing steps.

Production of the lipolytic enzyme which is recovered according to the method of this invention can be carried out by conventional fermentation procedures. Thus, a nutrient medium containing assimilable carbon, nitrogen and trace minerals is incubated with a culture of a species of Mucor, especially *Mucor miehei*, and fermented under submerged aerobic conditions at a pH of from about 3 to about 8 and a temperature of from about 20° to about 50°C for about 2 to about 14 days. Examples of strains of *Mucor miehei* which can be fermented thusly to produce the desired lipolytic enzyme are available to the public without restriction under the code designations NRRL A 13, 131 and A 13,042 at the Northern Regional Research Laboratories, Peoria, Ill. Other suitable strains of *Mucor miehei* and other Mucor species, for example, the species *pusillus*, *hiemalis*, *rouxii*, *genevensis*, *lamprosporous* and *racemosus*, will be readily apparent to the person skilled in the art after reading the disclosure herein.

Following the fermentation, the lipolytic enzyme can be recovered directly from the mash, or from the filtered mash, or from a concentrate of the growth product liquor. Thus, the mash can be used directly or the mash can be filtered such as to remove the mycelium and other solid matter remaining from the fermentation, or the growth product liquor can be concentrated such as by evaporation to reduce the volume of material to be handled by the recovery procedure of this invention.

EXAMPLE 1

*Mucor miehei*, NRRL 13,042, is grown under aerobic fermentation conditions at 37° C, pH 6, in a production tank containing the following aqueous nutrient medium:

| | |
|---|---|
| Kaysoy Defatted Soybean Meal | 4.0% |
| Spray Dried Sweet Whey | 4.0 |
| Cornstarch Liquified with Bacterial α-amylase | 16.0 |
| Water | 76.0 |
| | 100.0% |

The fermentation broth is harvested after 77 hours fermentation and the desired lipolytic enzyme is then recovered as follows: The fermentation broth is filtered and evaporated to Baume 24° concentration. The filtered evaporate is then adjusted to Baume 3.0° with water and the pH adjusted to 5.0 with 2N NaOH. Volclay KWK (bentonite) is then added to 125 grams of the diluted evaporate to a concentration of 2.5% by weight. The mixture is stirred for 1 hour at 25° C and then filtered in the presence of 2.0% by weigh Hyflo Super-Cel filter aid (diatomite having a screen analysis of 5% retained on 150 Mesh). The pH of the filtrate is adjusted to pH 4.0 with 2N HCl, evaporated to 14.2 grams and assayed for rennet and lipolytic enzyme. The assays show 72.7% rennet recovered and 0% lipolytic enzyme recovered. The filter cake remaining from the foregoing filtration step (12.6 grams) is suspended in 100 ml. water and the pH adjusted to 10.0 with 1N NaOH. The mixture is stirred for 1 hour at 23°–25° C. Speedex filter aid (diatomite) is then added to a concentration of 3% and the mixture filtered. The pH is then adjusted to 4.0 with 2N HCl, evaporated to about 6 times concentration and then assayed for lipolytic enzyme. The assay shows 127% lipolytic enzyme recovery.

EXAMPLE 2

The recovery procedure of Example 1 is repeated except that the starting material is diluted to Baume 6.0° and Filter-Cel diatomaceous earth is used in place of the Volclay. In one run using 2.5% by weight Filter-Cel, 251% of the lipolytic enzyme activity is recovered, and in another run using 5.0% by weight Filter-Cel, 151% of the lipolytic enzyme activity is recovered.

The lipolytic enzyme assays set forth in Examples 1 and 2, above, are on the basis of the enzyme assays of the starting filtered evaporates. The enzyme assays are made in accordance with procedures set forth in copending application Ser. No. 458,737, filed May 2, 1974, and exhibit EA/LA ratios greater than one. These assays show that more lipolytic enzyme is detected in the recovered product than in the starting material by the assay procedure employed.

EXAMPLE 3

Examples 1 and 2 are repeated, except that the fermentations are carried out with an aqueous nutrient medium containing 12% enzymatically degraded cornstarch, 1.5% soybean flour (Nutrisoy 300 C), and 3% dried whey and the fermentation broth is harvested after 114 hours fermentation. Following the recovery procedures as in Examples 1 and 2, substantially similar selective and quantitative recovery of lipolytic enzyme is achieved.

EXAMPLE 4

From another production tank fermentatin of *Mucor miehei* under aerobic fermentation conditions in suitable nutrient media, the resulting growth product is diluted with an equal volume of water and the pH is adjusted to 5.0 with N HCl. A portion of the diluted mash (300 grams) is treated with (a) 5% by weight of Volclay and (b) a similar portion with 5% by weight of Filter-Cel as in Examples 1 and 2, respectively. In each case, (a) and (b), 2% by weight Hyflo Super-Cel filter aid is added, the material is filtered and the cake is then sparged with water. Each filter cake is divided into three equal parts and taken up in 100 ml. of water per 25 grams of cake. The pH of the three parts is adjusted to 10.0, 10.5 and 11.0, respectively, with 2N NaOH and, after stirring for 1 hour at 25° C, the material is filtered and sparged with water. The combined filtrate and sparge is adjusted to pH 5.2–5.5 wigh N HCl and assayed.

The rennet and lipolytic enzyme in the original diluted mash, in the Volclay and Filter-Cel filtrates, and in the eluted Volclay and Filter-Cel cakes are set forth as follows:

| | Assay Substrate | Rennet % Yield | Lipolytic Enzyme % Yield |
|---|---|---|---|
| | Mash 1:1 diluted | 100 | 100 |
| (a) | 5% Volclay filtrate | 54.4 | 10 |
| (b) | 5% Filter-Cel filtrate | 85.8 | 11.2 |
| (a) | | | |
| | Volclay cake eluted at pH 10.0 | | 127 |
| | Volclay cake eluted at pH 10.5 | | 118 |
| | Volclay cake eluted at pH 11.0 | | 22.5 |
| (b) | | | |
| | Filter-Cel cake eluted at pH 10.0 | | 62.2 |
| | Filter-Cel cake eluted at pH 10.5 | | 121.0 |
| | Filter-Cel cake eluted at pH 11.0 | | 36.7 |

Various other examples and modifications of the foregoing examples will be apparent to the person skilled in the art after reading the foregoing specification without departing from the spirit and scope of the invention. All such further examples and modifications are included within the scope of the appended claims.

What is claimed is:

1. The method of selectivity and substantially quantitatively recovering lipolytic enzyme from rennet from the fermentation growth product of Mucor species comprising adsorbing said fermentation growth product with material selected from the group consisting of diatomaceous earth and clay at pH of from about 4 to about 6 and then eluting the lipolytic enzyme from the adsorbent by adjusting the pH to a range of from about 9 to about 11.

2. The method of claim 1 in which the Mucor species is *Mucor miehei*.

3. The method of claim 2 in which the *Mucor miehei* is the strain designated NRRL A 13,042.

4. The method of claim 1 in which the adsorbent is a diatomaceous earth.

5. The method of claim 1 in which the adsorbent clay is bentonite or kaolin.

6. The method of claim 1 in which the concentration of adsorbent is from about 0.5 to about 15% by weight of the fermentation growth product.

7. The method of claim 6 in which the concentration of adsorbent is from about 1 to about 5%.

8. The method of claim 1 in which the adsorption pH is about 5.

9. The method of claim 1 in which the elution pH is from about 10 to about 11.

10. The method of claim 4 in which the diatomaceous earth is Filter-Cel.

* * * * *